Patented Dec. 6, 1938

2,139,179

UNITED STATES PATENT OFFICE 2,139,179

PURIFICATION OF ALCOHOLS

Anton Johan Tulleners, Amsterdam, Netherlands, assignor to Shell Development Company, San Francisco, Calif., a corporation of Delaware No Drawing. Application June 20, 1936, Serial No. 86,340. In the Netherlands July 4, 1935

8 Claims. (Cl. 260—643)

This invention relates to the production of water-immiscible secondary alcohols or alcohol mixtures predominantly composed of secondary alcohols from absorption products of olefines in suitable mineral acid acting agents and deals with an improved process for the recovery of such alcohols from the absorption products in which they are formed, whereby the yield and purity of the alcohol or alcohols produced may be materially improved.

The difficulties of recovering these alcohols by distillation without serious decomposition are well known and it has been common practice to neutralize hydrolyzed olefine absorption products prior to the recovery of alcohols therefrom by distillation. While this has been useful in protecting the distillation apparatus from corrosion and has somewhat reduced decomposition, it has not been effective in eliminating distillation decomposition to the desired extent.

I have found that there is apparently an alcohol soluble impurity, the exact nature of which I have not as yet determined beyond the fact that it appears to be generally higher molecular and contains sulfur, which is responsible for the undesirable decomposition heretofore experienced in the distillation of crude water-immiscible secondary alcohols. I have also found that suitable removal and/or conversion or decomposition or other appropriate treatment which renders the sulfur-containing impurities of crude alcohol substantially innocuous is effective in substantially eliminating the above described disadvantage of prior methods of secondary alcohol recovery and also results in products of greater purity.

In accordance with my invention the sulfur-containing impurities of crude water-immiscible secondary alcohols may be removed and/or rendered innocuous in several different ways before applying the main purification treatment without causing substantial decomposition of the alcohol or alcohols involved. For example, flash distillation and/or preferential solvent extraction and/or digestion with suitable basic agents may be used.

My invention may be practiced with any crude water-immiscible secondary alcohol or alcoholic mixture predominantly composed of secondary alcohols obtained by hydration of the corresponding olefine or olefines regardless of the source of the olefine or olefines involved or of the conditions of olefine hydration employed. Suitable methods for carrying out the olefine hydration are described for example, in United States Patents 1,955,416 and 1,995,417. Other methods of producing higher secondary alcohols may of course be adopted. In any case however, the improved procedure of my invention is most preferably applied prior to any substantial vaporization of the alcohol or alcohols involved as such vaporization in the presence of active sulfur-containing impurities which are generally present in the crude alcohols leads to undesirable decomposition. Most preferably my invention is applied to the crude water-immiscible secondary alcohols obtained by stratification of suitably diluted hydrolyzed absorption products of secondary olefines. Such crude alcohols typically comprise one or more secondary alcohols of five or more carbon atoms per molecule together with small amounts of polymer and/or free hydrocarbons together with the sulfur-containing impurities which cause decomposition during distillation above referred to. Some free mineral acid acting acid and unhydrolyzed alkyl esters in small amounts may be present as well as some tertiary alcohol or alcohols in minor amounts.

One simple method of applying my invention with such starting material may comprise, for example, digestion in the presence of a base at a temperature and for a time at which the sulfur-containing impurities are rendered substantially innocuous. As basic agents which may be used when applying this modification of my invention are included inorganic bases such as ammonia, either gaseous or in aqueous solution, sodium, potassium or like alkali metal hydroxides, lime, either calcined or hydrated, sodium bicarbonate or other basic salts or organic bases, for example, amines, or quaternary ammonium bases as mono-, di- or tri-methyl or ethyl or like amines or tetramethylammonium hydroxide or the like. The basic agent is preferably added in such an amount as will not only neutralize all free acid and acid acting compounds present but also will preserve an alkaline condition in the mixture throughout the time of digestion. The latter will vary with the temperature of reaction employed, one-half to two hours being usually sufficient although even shorter periods may be adequate in some cases. Suitable digestion temperatures include about 80° C. to about 150° C., or preferably about 90° C. to about 120° C., higher temperatures permitting the use of shorter times. It will be understood that the alkaline digestion here referred to is distinguished from simple neutralization, with simultaneous generation of heat of reaction, by the fact that it is sufficiently prolonged to be effective in rendering sulfur-containing impurities innocuous, i. e. account is taken of the time factor involved. The digestion may be carried out with an anhydrous base, maintained suitably suspended in the crude alcohol if insoluble therein, or more preferably with an aqueous solution of base which advantageously may be separated by decantation or the like after the digestion is complete.

As an alternative to, or in conjunction with, the above alkaline digestion treatment, use may be made of my discovery that flash distillation whereby the crude mixture is heated for only relatively short times at temperatures which are not excessive, may be used to separate, as bottoms, the undesired impurities without substantial decomposition. In this method of operation flash distillation under vacuum prior to the fractional distillation proper may be advantageously used especially with mixtures containing alcohols of 10 or more carbon atoms although it is desirable with lower members as well.

Extraction with a preferential liquid solvent for the undesirable sulfur-containing impurity offers another useful means for the removal of this material from crude water-immiscible secondary alcohols before the main purification treatment. For this purpose solvents which have a higher solvent power for the sulfur-containing impurity than for the alcohol or alcohols involved are desirable, such, typically, as pyridine, piperidine, the picolines, thiophene, branched chain lower aliphatic hydrocarbons including isobutane, isopentane, isopropyl ethylene, and the like. Other solvents for the sulfur-containing impurity which form two phase mixtures with the alcohol or alcohols present may also be used. In any case suitable temperature control to promote phase distribution should be employed and other agents which promote phase separation and/or advantageously alter the solubilities of the various components may also be used. This method of operation may be used with either or both of the previously described modifications of my invention.

The following examples illustrate typical applications of the principles of my invention as applied to the manufacture of pentadecyl alcohols and to mixtures predominating in secondary hexyl, heptyl, octyl and nonyl alcohols, but it will be understood that a wide variety of other water-immiscible secondary alcohols including amyl and higher alcohols and secondary alcohol-containing mixtures may be prepared by similar or other equivalent methods such as have been described above.

*Example I*

A mixture of crude alcohols prepared by acid hydrolysis of an absorption liquid obtained by absorbing in a 90% sulfuric acid solution at 10–15° C., a vapor phase cracked distillate of crude paraffin cakes, boiling between 261 and 264° C. (A. S. T. M.), having a bromine number McIlhiney of 32.9 and chiefly containing hydrocarbons with 15 C-atoms, was neutralized at room temperature with a 1% solution of sodium bicarbonate and distilled at a pressure of 20 mm. mercury after drawing off the aqueous layer. A mixture of alcohols semi-solid at ordinary temperature, boiling between 170 and 180° C., and having an acetyl saponification figure of 163, was obtained in a yield of 53% by weight calculated on the mixture of crude alcohols. On the same mixture of crude alcohols being heated prior to the distillation, at 100 C., with an excess of a 20% NaOH solution during one hour while stirring, then by distillation at 20 mm. pressure after removal of the aqueous layer a mixture of alcohols was obtained with an acetyl saponification figure of 204, boiling between 170 and 180° C., and solid at room temperature. The yield amount to 59% by weight calculated on the mixture of crude alcohols.

*Example II*

A mixture of crude alcohols prepared by acid hydrolysis of an absorption liquid obtained by absorbing at 15–20° C., in a 90% $H_2SO_4$ solution a vapor phase cracked distillate of paraffin cakes boiling between 50 and 160° C. (A. S. T. M.), having a bromine number McIlhiney of 127 and chiefly containing alkenes with 6 to 9 C-atoms, was neutralized at room temperature with a 2% lye solution. When, after removal of the aqueous layer, the product was distilled fractionally, at about 160° C., a vehement decomposition occurred, water and $SO_2$ being formed, inter alia. The total yield of alcohols boiling between 130 and 200 C., amounted to 75% by weight, the acetyl saponification figure being 300.

When, however, after neutralization and removal of the aqueous layer the saponification product was first subjected to a flash distillation at 20 mm. pressure and a temperature of about 140° C., and the distillate then fractionated at atmospheric pressure, the yield of alcohols boiling between 130 and 200° C., amounted to 85% by weight, the acetyl saponification figure being 328.

Similar improvements in yield and purity of product may be obtained by removal, in the extract phase, of the decomposition producing sulfur-containing impurities, by treatment with pyridine or thiophene, or other suitable preferential liquid solvents for these impurities.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories advanced as to the advantageous results attained. On the other hand, the invention is to be regarded as limited only by the terms of the accompanying claims, in which it is my intention to claim all novelty inherent therein as broadly as is possible in view of the prior art.

I claim as my invention:

1. In a process for purifying a crude water-immiscible secondary alcohol obtained by hydration of the corresponding olefine, the steps of removing sulfur-containing impurities present by digesting the crude alcohol with a basic agent prior to the main purification treatment of said alcohol without causing substantial alcohol decomposition, flash distilling the resulting alcohol by heating at a temperature and for a time at which said alcohol is vaporized without substantial decomposition, then extracting the alcohol with a preferential liquid solvent for said impurities and recovering the resulting substantially sulfur free alcohol.

2. In a process for purifying a crude water-immiscible secondary alcohol obtained by hydration of the corresponding olefine, the step of removing sulfur-containing impurities present by flash distillation by heating at a temperature and for a time at which said alcohol is vaporized without substantial decomposition and without substantial vaporization of said impurities.

3. In a process for purifying a crude water-immiscible secondary alcohol obtained by hydration of the corresponding olefine, the step of removing sulfur-containing impurities present which cause decomposition during fractional distillation by heating the crude alcohol at a temperature and pressure and for a time in the presence of a solvent for sulfur-containing impurities present which solvent is immiscible with said alcohol at which separation of said impurities is effected without substantial vaporization thereof and without substantial decomposition of said alcohol.

4. In a process for purifying a crude water-immiscible alcohol obtained by hydrolysis of an absorption product of the corresponding olefine in a mineral acid acting acid, dilution, stratification and removal of the aqueous phase, the step of effecting the removal of sulfur-containing impurities present therein by extraction with a preferential liquid solvent for said impurities.

5. In a process for purifying a crude water-immiscible secondary alcohol obtained by hydration of the corresponding olefine, the step of effecting the removal of sulfur-containing impurities present which cause decomposition during fractional distillation by digesting said crude alcohol with a basic agent prior to the main purification treatment of said alcohol without causing substantial alcohol decomposition.

6. A process for the recovery of a substantially water-immiscible alcohol from a hydrolyzed absorption product of the corresponding olefine in a mineral acid acting acid which comprises diluting said absorption product with sufficient aqueous medium to cause substantial separation of said alcohol therefrom, separating the resulting alcoholic phase from the aqueous phase, rendering the separated alcoholic phase alkaline, heating the alkalinized mixture at a temperature and for a time at which alcohol decomposition producing sulfur-containing impurities present are rendered substantially innocuous without substantially vaporizing said alcohol and removing said alcohol from other components of the resulting mixture.

7. In a process for purifying a crude water-immiscible secondary alcohol obtained by hydration of the corresponding olefine, the steps of digesting said crude alcohol with an aqueous solution of an alkali metal hydroxide at a temperature and for a time at which substantial conversion of the sulfur-containing impurity content of said crude alcohol is effected, removing the aqueous alkali from the digested mixture and distilling the resulting substantially sulfur free alcohol.

8. In a process for purifying a crude water-immiscible preponderantly secondary alcohol containing mixture obtained by phase separation from a hydrolyzed absorption product of the corresponding olefines in a strong polybasic inorganic acid, the step of removing sulfur-containing impurities present by flash distillation of the neutralized mixture under reduced pressure by heating at a temperature and for a time at which said alcohol is vaporized without substantial decomposition and without substantial vaporization of said impurities.

ANTON JOHAN TULLENERS.